United States Patent [19]

Beauviala

[11] Patent Number: 5,366,172
[45] Date of Patent: * Nov. 22, 1994

[54] CINE CAMERA EMPLOYING INTERCHANGEABLE FILM MAGAZINES WITH DISPLACEMENT OF THE SPINDLES OF THE FILM TAKE-OFF AND TAKE-UP REELS

[75] Inventor: Jean-Pierre Beauviala, Grenoble, France

[73] Assignee: Aaton, Grenoble, France

[*] Notice: The portion of the term of this patent subsequent to Oct. 31, 2006 has been disclaimed.

[21] Appl. No.: 759,856

[22] Filed: Sep. 16, 1991

Related U.S. Application Data

[60] Continuation of Ser. No. 405,956, Sep. 12, 1989, abandoned, which is a division of Ser. No. 185,077, Apr. 22, 1988, Pat. No. 4,877,200.

[30] Foreign Application Priority Data

Apr. 28, 1987 [FR] France .................. 87 06000

[51] Int. Cl.$^5$ ................................. G03B 1/04
[52] U.S. Cl. ............................ 242/342; 242/345; 352/72
[58] Field of Search .............. 360/132; 352/72, 166; 242/199, 200, 205

[56] References Cited

U.S. PATENT DOCUMENTS

| | | | |
|---|---|---|---|
| 3,348,786 | 10/1967 | Miller et al. | 242/200 |
| 3,386,676 | 6/1968 | Tadashi Sotani et al. | 242/200 |
| 4,054,253 | 10/1977 | Heurtier | 242/205 |
| 4,196,984 | 4/1980 | Komine et al. | 352/72 X |
| 4,466,584 | 8/1984 | Chevalier et al. | 242/199 |
| 4,491,430 | 1/1985 | Kuelzer | 242/199 X |
| 4,518,135 | 5/1985 | Gebeke | 242/199 |
| 4,826,310 | 5/1989 | Goodman | 242/199 X |
| 4,877,200 | 10/1989 | Beauviala | 242/205 |

Primary Examiner—Stuart S. Levy
Assistant Examiner—Kevin M. Watkins
Attorney, Agent, or Firm—Lyon & Lyon

[57] ABSTRACT

A cine camera employing interchangeable film magazines with displacement of the spindles of the film take-off and take-up reels, comprises an electric motor mounted on the body of the camera and of which the horizontal driven shaft is fast with a driving magnetic plate of a magnetic coupler which is housed in an opening in the body coaxial with the axis of the motor and of the shaft. The outer front face of the driving magnetic plate is substantially flush with the outer face of the body which is adjacent the outer face of the wall of the casing of the interchangeable magazine. The magnetic coupler comprises, in the magazine, a driven magnetic plate of which the axis merges with that of the driving magnetic plate. The driven magnetic plate is fast with a driving pinion and the driven magnetic plate and the driving pinion are mounted to rotate, in the magazine, about an axis which is merged with the axis of the drive motor. The driving pinion is coupled to a driven pinion which is fast with the spindle of the take-up reel and coaxial therewith an this spindle and the driven pinion are mounted to rotate jointly on a plate which is itself mounted to pivot about the axis of the driven plate/driving pinion assembly.

17 Claims, 2 Drawing Sheets

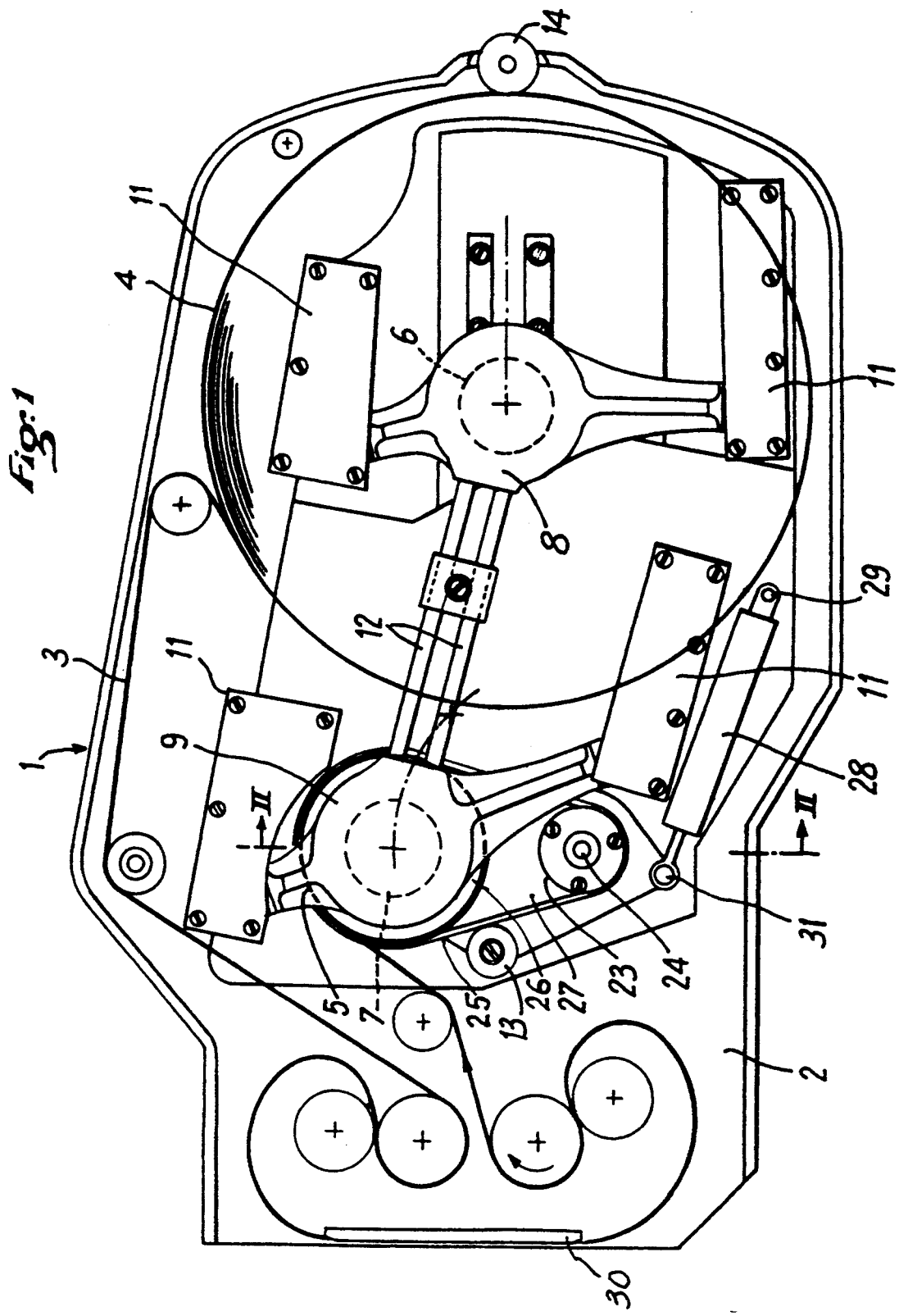

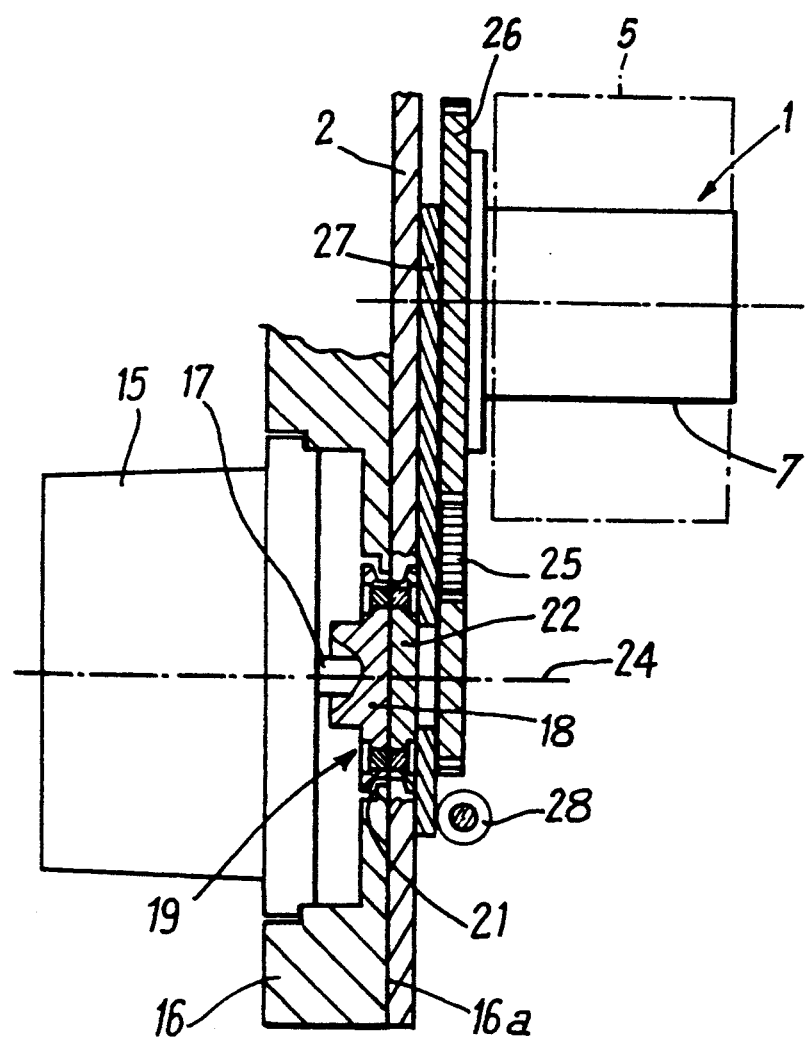

CINE CAMERA EMPLOYING INTERCHANGEABLE FILM MAGAZINES WITH DISPLACEMENT OF THE SPINDLES OF THE FILM TAKE-OFF AND TAKE-UP REELS

This application is a continuation of application Ser. No. 07/405,956, filed Sep. 12, 1989, now abandoned, which was a division of application Ser. No. 07/185,077 filed Apr. 22, 1988, now U.S. Pat. No. 4,877,200 issued Oct. 31, 1989.

BACKGROUND OF THE INVENTION

The present invention relates to a cine camera employing interchangeable film magazines with displaceable spindles for displacement of the film take-off and take-up reels.

Cine cameras with interchangeable magazines are already known in which spindles for the take-off and take-up reels move as the film is consumed. Such displacement follows the variation in the diameter of the reels so that the spindle of the take up reel is displaced as the diameter of the take up reel increases in the direction of the take off reel for which the diameter decreases. Simultaneously, the spindle of the take off reel is displaced in the same sense owing to the provision of connecting means between the spindles of the two reels in order to ensure simultaneous translation thereof. This arrangement makes it possible to produce relatively compact magazines since the volume occupied at any instant by the two take-off and take-up reels is less than the volume which would have to be reserved for these reels if the spindles thereof were mounted in a fixed position in the magazine.

In magazines of this type the spindle of the take up reel is driven in rotation by means of an independent electric motor housed in the magazine. Such an arrangement obviously presents drawbacks since it is necessary to provide an electrical supply of the motor located inside the magazine from the battery housed in the body of the camera and furthermore each magazine is relatively heavy and cumbersome since it is necessary to provide one motor per magazine.

SUMMARY OF THE INVENTION

It is an object of the present invention to overcome these drawbacks by providing a cine camera of particularly simple design having interchangeable magazines which are considerably lightened and simplified.

To that end this cine camera employing interchangeable film magazines with displaceable spindles for the film take off and take up reels, these spindles being rendered fast in translation by connecting means is characterized in that it comprises an electric motor mounted on the body of the camera and having a horizontal driven shaft which is fast with a driving magnetic plate of a magnetic coupler which is housed in an opening in the body coaxial with the axis of the motor and of the shaft. The outer front face of the driving magnetic plate is substantially flush with the outer face of the body which is adjacent to the outer face of the wall of the casing of the interchangeable magazine and the magnetic coupler comprises, in the magazine, a driven magnetic plate and of which the axis merges with that of the driving magnetic plate the driven magnetic plate is fast with a driving pinion and the driven magnetic plate and the driving pinion are mounted to rotate, in the magazine, about an axis which is merged with the axis of the drive motor, the driving pinion being coupled to a driven pinion which is fast with the spindle of the take-up reel and coaxial therewith and this spindle and the driven pinion are, mounted to rotate jointly on a plate which is itself mounted to pivot about the axis of the driven plate/driving pinion assembly.

BRIEF DESCRIPTION OF THE DRAWINGS

The invention will be more readily understood on reading the following description with reference to the accompanying drawings, in which:

FIG. 1 is a simplified view in elevation of an interchangeable magazine with displacement of the spindles of the reels for a cine camera according to the invention.

FIG. 2 is a view in section along line II—II of FIG. 1.

DESCRIPTION OF THE PREFERRED EMBODIMENTS

Referring now to the drawings the cine camera according to the invention employs interchangeable magazines 1 which comprise a casing 2 inside which is stored a certain length of wound cinematographic film 3, before being printed, to constitute a take off reel 4. The film 3 passes in conventional manner over take off rollers so as to be intermittently stopped in front of a filming window located to the rear of the lens mounted on the body of the camera in which the magazine 1 is engaged. After having been printed the film is wound on itself to constitute a take-up reel 5.

The take off reel 4 and take-up reel 5 are respectively wound on horizontal spindles 6, 7, parallel to each other and which are mounted in respective bearings 8, 9. These bearings 8, 9 are fast with arms engaged in guiding elements 11 fixed to the casing 2 and they are also connected by coupling rods 12. Consequently, as the printed film is wound to constitute the take-up reel 5 and as the diameter thereof increases, the spindle 7 of the take-up reel is displaced towards the right in FIG. 1 further to the reaction, exerted on the reel formed which abuts by its lateral surface on a stop 13 located on the filming window side i.e. opposite the take off reel 4, for example below and to the left of the bearing 9. This stop 13 is constituted by a roller mounted on a ball bearing or the like, in order to reduce friction.

Due to the coupling between the bearings 8 and 9 by means of rods 12 the displacement of spindle 7 towards the right is translated by a concomitant displacement of the spindle 6 of the take-off reel 4 likewise towards the right. Consequently, as the diameter of the take-up reel 5 increases and the diameter of the take-off reel 4 decreases, the two spindles 7, 6 of these two reels are displaced simultaneously towards the right. To some extent, the increase in diameter of the take-up reel 5 is compensated for by the correlative reduction in the diameter of the take-off reel 4. This take-off reel 4 is maintained in contact with a stop 14 located in the extreme right hand part of the casing 2, i.e. opposite the take-up reel 5, this stop 14 being constituted by a roller mounted on an appropriate bearing to reduce, friction.

As is shown more particularly in FIG. 2, the spindle 7 of the take-up reel 5 is driven, in rotation from an electric motor 15 mounted on the body 16 of the camera. The horizontal driven shaft 17 of the drive motor 15 is fast with a driving magnetic plate 18 of a magnetic coupler 19, of any appropriate type, which is housed in an opening in the body 16 coaxial with the axis of the motor 15 and of the shaft 17. The outer front face of the driving magnetic plate 18 is substantially flush with the outer face 16a of the body 16 which is adjacent the outer face of the wall of the casing 2 of the interchangeable magazine. The magnetic coupler 19 comprises, in the magazine 1, a driven magnetic plate 22 which is housed in an opening in the wall of the casing 2 and which is mounted against the driving magnetic plate 18 or in the immediate vicinity thereof, when the magazine 1 is fitted in the body 16 of the camera. In this position, the axis of the driven magnetic plate 22 merges with that of the driving magnetic plate 18. The driven magnetic plate 22 is fast, inside the magazine 1, with a driving pinion 23 and the driven magnetic plate 22 and the driving pinion 23 are mounted to rotate, in magazine 1, about an axis 24 which is merged with the axis of drive motor 15. The driving pinion 23 is coupled, via a synchronous belt 25, with a driven pinion 26 of larger diameter which is fast with the spindle 7 of the take-up reel and coaxial therewith. The spindle 7 and the driven pinion 26 are mounted jointly to rotate on a plate 27 which is itself mounted to pivot about the axis 24 of an assembly formed by the driven plate 22/driving pinion 23.

Consequently, according to the foregoing description, it may be seen that the driving movement of the spindle 7 of the take-up reel 5 is obtained from the motor 15 which is borne by the body 16 of the camera. Consequently, not every magazine 1 contains an associated electric motor, which reduces its weight and simplifies the problems of electrical supply. As the take up reel 5 increases in diameter, the plate 27 pivots progressively in a clockwise direction about axis 24, since the take up reel 5 is in abutment against the roller thrust bearing 13. This pivoting movement provokes a progressive displacement of the spindle 7 towards the right and the correlative displacement towards the right of spindle 6 of the take-off reel 4 which always remains in contact with the roller thrust bearing 14.

A damping member 28 of any appropriate type is preferably connected on the one hand to the casing 2, about a pivot axis 29, and, on the other hand, to the plate 27, below the pivot axis 24 of this plate, about a pivot axis 31. This damping member ensures a braking of the movements and avoids any sudden movement.

I claim:

1. A film magazine for supplying unexposed film to a cine camera and for receiving exposed film, comprising:
    a casing;
    a driving pinion within said casing, said driving pinion releasably coupleable to a motor external to said casing;
    a driven pinion operably connected to said driving pinion by a driving means, said driven pinion longitudinally translatable within said casing along an arc about said driving pinion, said driving pinion being positioned at a center of curvature of the arc;
    a take-off reel longitudinally movable along a path separate from the arc of the driven pinion within said casing, said take-off reel supplying unexposed film to the cine camera; and
    a take-up reel mounted on said driven pinion and coupled to said take-off reel.

2. The film magazine of claim 1, wherein the driving means comprises a synchronous belt.

3. The film magazine of claim 1, further comprising a stop in said casing, said stop including a roller against which said take-up reel abuts, said stop being located on a filming window side and opposite to said take-off reel.

4. The film magazine of claim 3, wherein said roller acts to cause said take-up reel to pivot along the arc about the driving pinion as film winds onto said take-up reel.

5. The film magazine of claim 4, wherein film winding onto said take-up reel abuts against said roller acts causing said roller to translate longitudinally along the arc about the driving pinion.

6. The film magazine of claim 3, wherein film winding onto said take-up reel abuts against said roller acts causing said roller to translate longitudinally along the arc about the driving pinion.

7. The film magazine of claim 1 wherein said take-off reel is longitudinally moveable along a straight line path within said casing.

8. The film magazine of claim 1, wherein said take-up reel is coupled to said take-off reel by at least one coupling rod.

9. A cine camera comprising:
    (a) a camera body,
    (b) an interchangeable film magazine attachable to said camera body for supplying unexposed film to the cine camera and for receiving exposed film, comprising:
        a casing;
        a take-off reel longitudinally moveable within said casing, said take-off reel supplying unexposed film to the cine camera;
        a driving pinion within said casing;
        a driven pinion operably connected to said driving pinion by a driving means, said driven pinion longitudinally translatable within said casing along an arc centered about said driving pinion; and
        a take-up reel mounted on said driven pinion and coupled to said take-off reel,
    (c) a motor mounted on the camera body external to said casing of the interchangeable film magazine, and
    (d) connection means between said motor and said driving pinion for releasably coupling said motor to said driving pinion for rotating said take-up reel.

10. The cine camera of claim 9, wherein said connection means comprises a magnetic coupler.

11. The film magazine of claim 9, further comprising a stop in said casing, said stop including a roller against which said take-up reel abuts, said stop being located on a filming window side and opposite to said take-off reel.

12. The film magazine of claim 11, wherein said roller acts to cause said take-up reel to pivot along the arc about the driving pinion as film winds onto said take-up reel.

13. The film magazine of claim 12, wherein film winding onto said take-up reel abuts against said roller acts causing said roller to translate longitudinally along the arc about the driving pinion.

14. The cine camera of claim 9 wherein said take-off reel is longitudinally moveable along a straight line path within said casing.

15. The cine camera of claim 9, wherein said take-up reel is coupled to said take-off reel by at least one coupling rod.

16. A cine camera, comprising:
    (a) a camera body,
    (b) an interchangeable film magazine attachable to said camera body for supplying unexposed film to the cine camera and for receiving exposed film, comprising:

a casing;

a take-off reel longitudinally moveable within said casing, said take-off reel supplying unexposed film to the cine camera;

a driving pinion within said casing;

a driven pinion operably connected to said driving pinion by a driving means, said driven pinion being longitudinally translatable within said casing along an arc about said driving pinion; and a take-up reel mounted on said driven pinion and coupled to said take-off reel, (c) a motor mounted on the camera body, and (d) connection means between said motor and said driving pinion for releasably coupling said motor to said driving pinion for rotating said take-up reel, said connection means comprising a magnetic coupler, said motor being coupled with a drive shaft to a driving magnetic plate of a driving magnetic coupler disposed in an opening in said camera body;

said camera body having an outer face and said driving magnetic plate having an outer front face which is substantially flush with the outer face of said camera body;

said film magazine including a driven magnetic coupler in a side wall of said casing, said magnetic coupler including a driven magnetic plate disposed in an opening in said side wall, said driven magnetic plate having an outer front face flush with an outer face of the side wall of said film magazine; and said driven magnetic plate and said driving magnetic plate being coaxial and magnetically attaching to one another when said film magazine is attached to said camera body.

17. A film magazine for supplying unexposed film to a cine camera and for receiving exposed film, comprising:

a casing;

a driving pinion within said casing, said driving pinion releasably coupleable to a motor external to said casing via a connector;

a driven pinion operably connected to said driving pinion, said driven pinion being longitudinally translatable within said casing along an arc about said driving pinion, said driving pinion being positioned at a center of curvature of the arc;

a take-off reel longitudinally movable along a path separate from the arc of the driven pinion within said casing, said take-off reel supplying unexposed film to the cine camera; and a take-up reel mounted on said driven pinion and coupled to said take-off reel, wherein said connector comprises a magnetic coupler, said motor being coupled with a drive shaft to a driving magnetic plate of a driving magnetic coupler disposed in an opening in said camera body, said camera body having an outer face and said driving magnetic plate having an outer front face which is substantially flush with the outer face of said camera body, said film magazine including a driven magnetic coupler in a side wall of said casing, said magnetic coupler including a driven magnetic plate disposed in an opening in said side wall, said driven magnetic plate having an outer front face flush with an outer face of the side wall of said film magazine, and said driven magnetic plate and said driving magnetic plate being coaxial and magnetically attaching to one another when said film magazine is attached to said camera body.

* * * * *